United States Patent [19]

Wolff

[11] Patent Number: 4,761,940
[45] Date of Patent: Aug. 9, 1988

[54] ROTARY MOWER

[75] Inventor: Michel Wolff, Hochfelden, France

[73] Assignee: Kuhn, S. A., Cedex, France

[21] Appl. No.: 777,582

[22] Filed: Sep. 19, 1985

[30] Foreign Application Priority Data

Sep. 19, 1984 [FR] France ............................ 84 14487

[51] Int. Cl.$^4$ ............................................. A01D 35/26
[52] U.S. Cl. ...................... 56/13.6; 56/235; 56/238; 56/295
[58] Field of Search ................ 56/13.5–13.9, 56/234–235, 238, 289, 295

[56] References Cited

U.S. PATENT DOCUMENTS

| 4,103,476 | 8/1978 | Oosterling et al. ............ 56/295 X |
| 4,183,196 | 1/1980 | Oosterling et al. ............ 56/13.6 X |
| 4,197,692 | 4/1980 | Weber . |
| 4,302,921 | 12/1981 | Weber . |
| 4,365,462 | 12/1982 | Werner et al. . |
| 4,426,828 | 1/1984 | Neuerburg . |
| 4,443,998 | 4/1984 | Neuerburg ................ 56/295 X |
| 4,452,034 | 6/1984 | Neuerburg . |
| 4,557,104 | 12/1985 | Toillie et al. . |

FOREIGN PATENT DOCUMENTS

| 0070585 | 1/1983 | European Pat. Off. ............ 56/13.6 |
| 2002622 | 2/1979 | United Kingdom . |
| 2089637 | 6/1982 | United Kingdom . |
| 2158337 | 11/1985 | United Kingdom ................ 56/255 |

Primary Examiner—William E. Kamm
Assistant Examiner—Angela D. Sykes
Attorney, Agent, or Firm—Oblon, Fisher, Spivak, McClelland & Maier

[57] ABSTRACT

The invention relates to rotary mowers driven from below. According to the invention, shafts (18) and wheels (23) have at least their operational dimensions approximately identical, and alternate wheels (23) take two different positions in relation to the shafts (18). Moreover, when one of the disks (5, 6) is inclined in relation to an adjacent disk, the wheel (23) of the disk most inclined toward the front is farther from the disk (5, 6) than the wheel (23) is from the adjacent disk (5, 6). Moreover, the housing (4) comprises a sliding member (30) which at least partially closes the front part and/or the lower part of the housing (4).

22 Claims, 6 Drawing Sheets

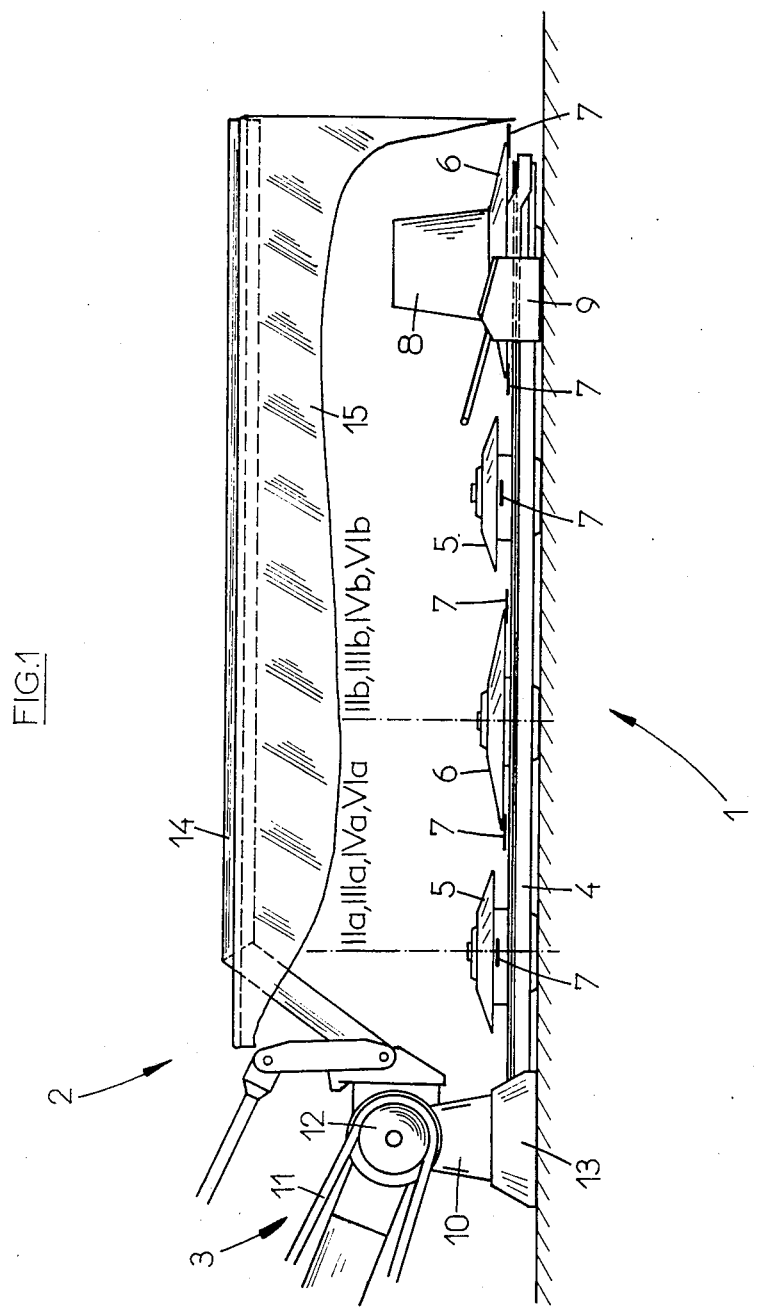

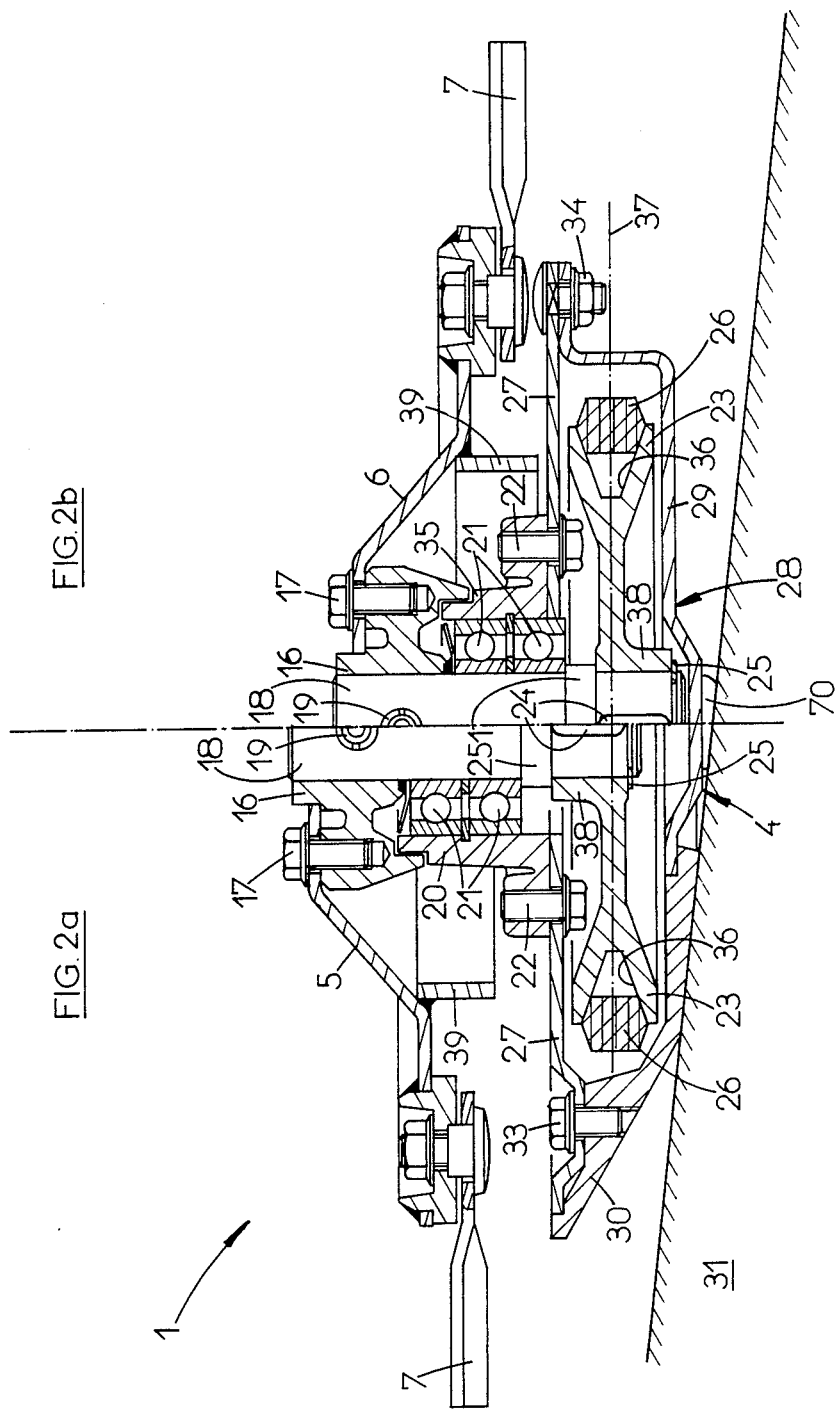

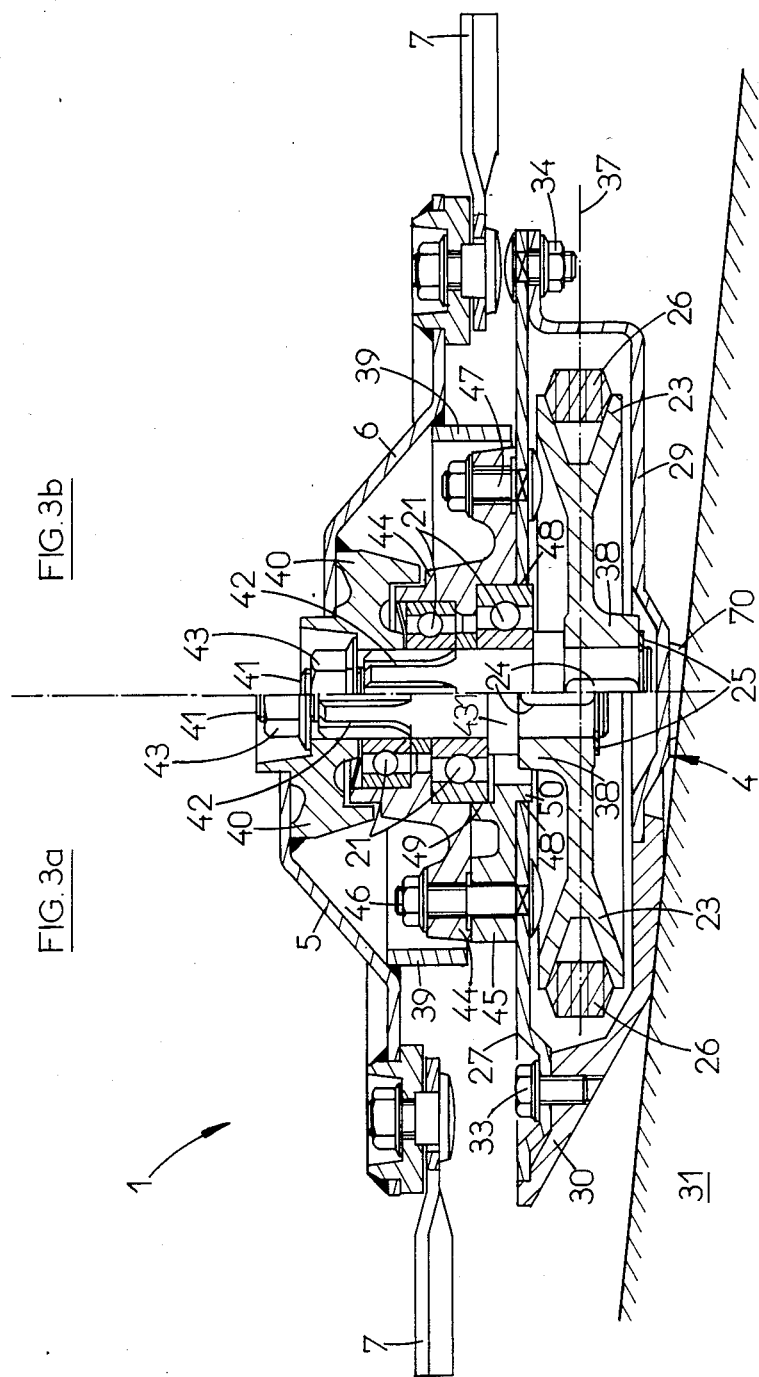

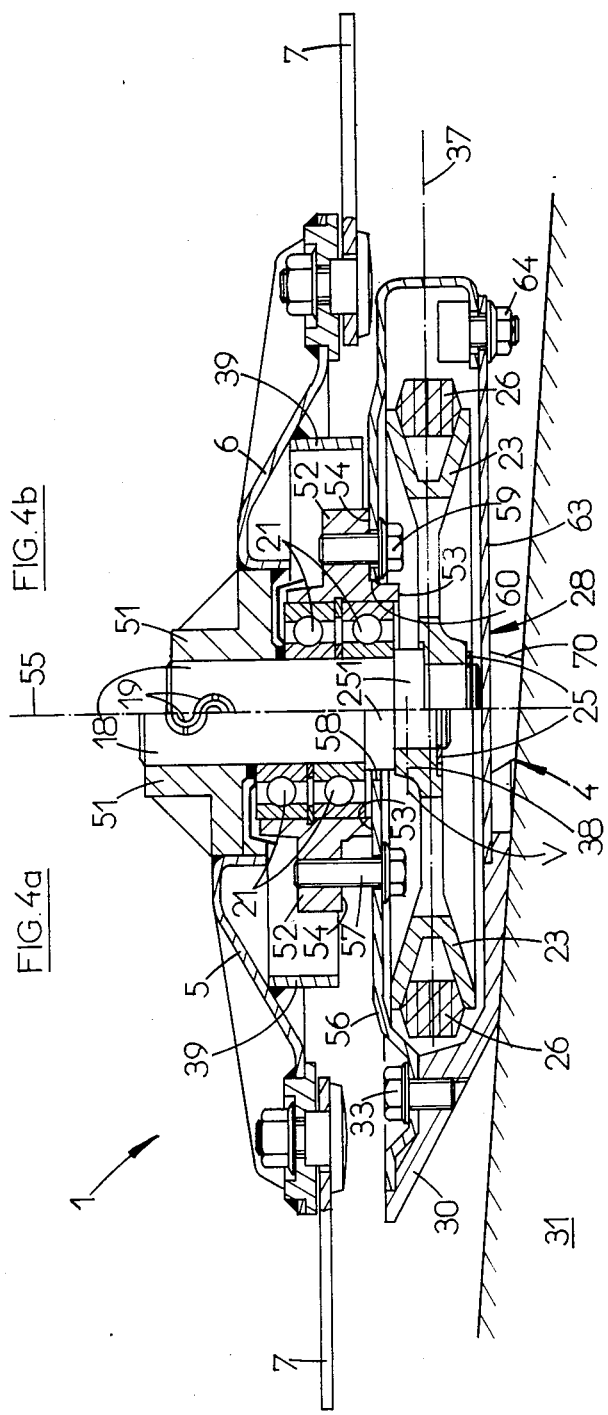
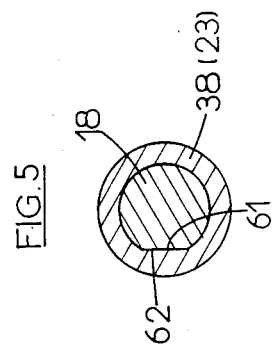
FIG. 4a  FIG. 4b  FIG. 5

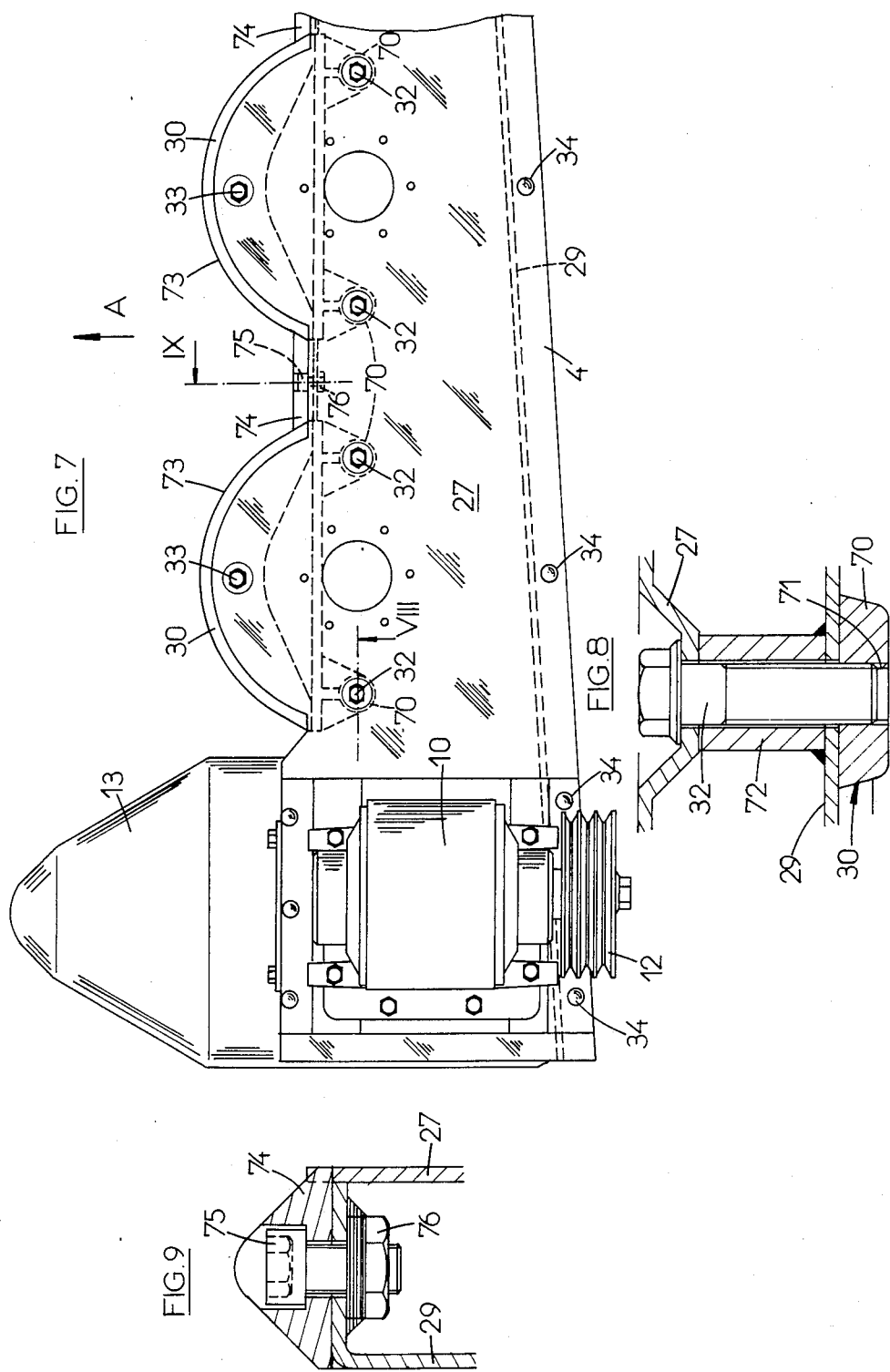

4,761,940

ROTARY MOWER

FIELD OF THE INVENTION

This invention relates to a rotary mower provided with at least two cutting elements placed on the upper face of a housing and each connected to an upwardly directed shaft which is guided in rotation in a bearing extending to the upper part of the housing. The cutting elements are driven in rotation by driving means housed in the housing.

BACKGROUND OF THE INVENTION

A mower of this general type is known the drive means of which consists of wheels keyed on upwardly directed shafts and driven in rotation by a belt. This drive mechanism does not make it possible to assure a synchronous transmission of movement. The belt can slip on the wheels during working of the mower when one or the other of the cutting elements, which are connected to the wheels, is braked or locked for any reason, such as obstacles, piles of heavy hay, etc.

When desynchronization between two adjacent wheels reaches a certain value, and if the cutting elements are located at the same level, the cutting tools mounted on the cutting elements can collide. These collisions can cause breaking of the cutting tools or of their fastenings.

Considering the high rotating speed of the cutting elements, a cutting tool that is broken or torn from its cutting element can cause serious accidents to persons in the vicinity of the mower or even to the machine operator. Further, a cutting element that is equipped with a broken cutting tool or on which a cutting tool is missing performs unsatisfactory work.

To reduce this serious drawback, the known mower has two adjacent cutting elements offset vertically in relation to one another, so as to turn in different planes of rotation. Thus, the cutting tools of two adjacent cutting elements can no longer collide with one another even if the positions of the cutting elements are desynchronized.

The drawback of this known mower resides in the fact that the upwardly directed shafts of different adjacent cutting elements are different. This therefore requires the production of two or more kinds of shafts, which causes an increase in the cost of the machines.

Another mower of this type is known which also had adjacent cutting elements turning in different planes of rotation. On this mower, the upwardly directed shafts on which the cutting elements are mounted are identical, and the offset between the cutting elements is obtained with braces placed between the shaft and the cutting element which must be higher.

This other known mower has two drawbacks.

A first drawback resides in the fact that, during remounting of a high cutting element after a repair or a cutting element change, the repairer may fail to replace the braces between the shaft and cutting element. In this case, there is a serious risk of an accident as explained above.

A second drawback resides in the fact that it is necessary to produce additional parts, in this case, braces. This, therefore, also raises the cost of the machine.

Again, another mower is known which comprises a pair of adjacent cutting elements, one of which is inclined in relation to the other. This inclination enables the cutting elements to turn in different planes of rotation, while having front points of the end paths described by the cutting tools mounted on the cutting elements approximately at the same level in relation to the ground surface.

When this design is applied to mowers with cutting elements driven from below such as those now known (i.e., by simply inclining one of the cutting elements in relation to the adjacent cutting element), the cutting height becomes undesirably great. Considering the size of the cutting elements of these known mowers, the housing located under the cutting elements must have a sufficient thickness to allow the transmission means (such as a belt, for example) to go from the wheel of one cutting element to the wheel of the adjacent cutting element. This is undesirable.

Another great drawback of certain known mowers resides in the fact the front part of the housing slides on the ground and protects the cutting elements. The front part of the housing therefore is subjected to heavy wear and more or less great impacts which can wear out the housing. Moreover, since the housing is made in one piece, it is necessary to change it completely, which involves considerable expenses for the user.

On other mowers it is know to fasten on the front part of the housing additional parts by means of which the cutter bar slides over the ground and which protect the cutting elements. These parts can then be replaced when they are worn out. These additional parts, however, make the cutter bar heavy, which already requires a lightening device so that the cutter bar will rest lightly on the ground during operation. Moreover, these additional parts raise the cost of the mower.

OBJECT OF THE INVENTION

This invention aims at remedying the various drawbacks of known mowers.

SUMMARY OF THE INVENTION

A first principal characteristic of the invention resides in the combination of the following:

(1) the upwardly directed shafts and the wheels that are fastened there have at least their operational dimensions approximately identical, and (2) a wheel can take two different positions in relation to the shaft, so that, for a high cutting element, the wheel is farther away from the high cutting element than the wheel of a low cutting element. With this arrangement, it is no longer necessary to produce two different shafts or additional braces for the two adjacent cutting elements to turn in different planes of rotation. The problems of costs and storage of parts are thus eliminated. Also, the risks of accidents as a result of poor remounting during repair are also eliminated.

The two positions that a wheel can take in relation to the shaft can be judiciously selected so that the part of the wheel where the transmission of movement occurs is approximately at the same level in relation to the housing in either of the two positions in relation to the shaft.

Preferably the shafts and/or the wheels are identical.

A simple embodiment of the invention is obtained when the hub of the wheel is axially offset in relation to the axis of symmetry of the part where the transmission of movement occurs. For a high cutting element, the hub is essentially located above the plane of symmetry, and, for a low cutting element, the hub is essentially located below the plane of symmetry.

Advantageously, the wheel is connected to the shaft by a detachable connection.

According to an additional characteristic of the invention, the bearings of the two adjacent cutting elements are different.

According to an additional characteristic of the invention, it is possible to lower the cost of the mower still more if the bearings of two adjacent cutting elements are identical. In this case, the bearings can take two positions in relation to the housing, or the upper part of the housing can comprise bulges which raise the bearings of the high cutting elements.

According to the second principal characteristic of the invention, one of the cutting elements in a pair of adjacent cutting elements is inclined in relation to the other cutting element in the pair, and the wheel of the cutting element most inclined toward the front is farther from the associated cutting element than the wheel of the other cutting element.

With this characteristic, it is possible to design a mower having a pair of adjacent cutting elements one of which is inclined in relation to the other without increasing the cutting height, while allowing a transmission means (such as a belt, for example) to go from one wheel to the other. The fact that the wheel of the cutting element most inclined toward the front is farther from the cutting element than the wheel of the adjacent cutting element allows the two wheels to extend in planes relatively close to one another.

According to a third principal characteristic of the invention, the mower housing comprises sliding means which at least partially close the front part and/or lower part of the housing. Advantageously, these sliding means are removably mounted on the housing.

The sliding means according to the invention therefore form an integral part of the mower housing. Accordingly, the weight of the cutter bar can be kept low without its being necessary to change the entire housing when the sliding means are worn out.

According to an additional characteristic of the invention, the sliding means also protect the cutting elements in the front.

The shape of these sliding means can be optimized when they are made by a casting process.

BRIEF DESCRIPTION OF THE DRAWINGS

Other characteristics and advantages of the invention will be apparent from the following description of some nonlimiting examples of embodiment shown on the accompanying drawings.

FIG. 1 is a rear view of the cutter bar of a mower according to the invention.

FIG. 2a is a view of the cutter bar of a first embodiment of a mower according to the invention, cut along plane IIa in FIG. 1.

FIG. 2b is a view of the cutter bar of the first embodiment of the invention, cut along plane IIb in FIG. 1.

FIG. 3a is a view of the cutter bar of a second embodiment of a mower according to the invention, cut along plane IIIa in FIG. 1.

FIG. 3b is a view of the cutter bar of the second embodiment of the invention, cut along plane IIIb in FIG. 1.

FIG. 4a is a view of the cutter bar of a third embodiment of a mower according to the invention, cut along plane IVa in FIG. 1.

FIG. 4b is a view of the cutter bar of the third embodiment of the invention, cut along plane IVb in FIG. 1.

FIG. 5 is a section of the shaft-wheel connection through plane V in FIGS. 4a and 4b.

FIG. 7 is a top view of the housing of the cutter bar of FIGS. 2a and 2b.

FIG. 8 is a section along plane VIII in FIG. 7.

FIG. 9 is a section along plane IX in FIG. 7.

DETAILED DESCRIPTION OF THE PREFERRED EMBODIMENTS

Figure 6A:
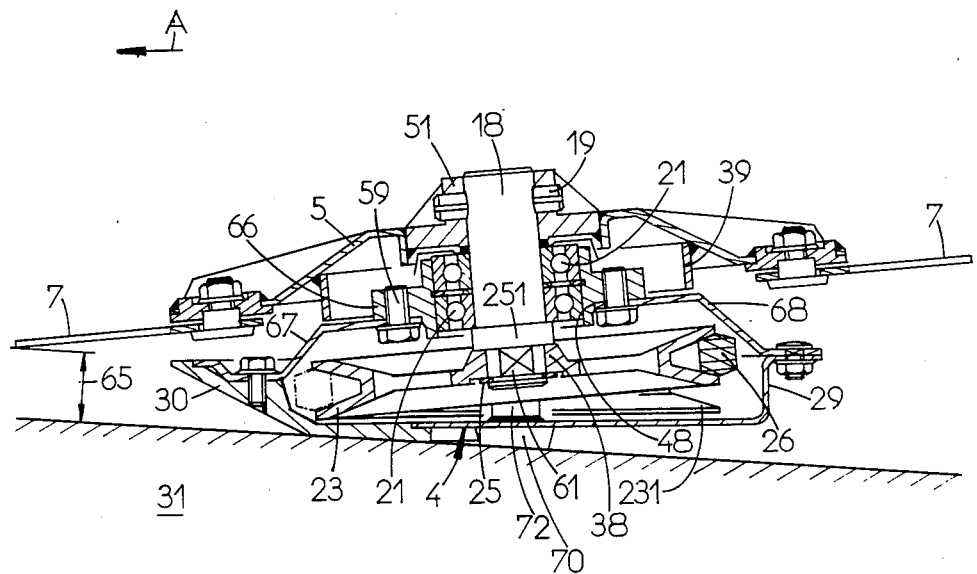
FIG. 6a is a view of the cutter bar of a fourth embodiment of a mower according to the invention, cut along plane VIa in FIG. 1.

FIG. 1 shows a cutter bar (1) of a mower (2). The mower (2) further comprises a hitching mechanism (3) which is only partially represented. The hitching mechanism makes it possible to hitch the cutter bar (1) to a farm tractor, for example.

The cutter bar (1) comprises a housing (4) in which means extend for driving a plurality of cutting elements such as high disk (5) and low disk (6). The disks (5, 6) extend to the upper part of the housing (4) and are provided with cutting tools such as knives (7). The low disk (6) located at the end of the cutter bar (1) remote from the hitching mechanism (3) is surmounted by a rotary windrowing device (8). The rotary windrowing device (8) cooperates with a stationary windrowing device (9) to reduce the width of the windrow of cut hay placed behind the cutter bar (1).

A transmission-gear housing (10) is located at the end of the cutter bar (1) located on the side of the hitching mechanism (3). The transmission-gear housing (10) serves to transmit the movement from a belt (11) to drive means located in the housing (4) of the cutter bar (1). For this purpose, the transmission-gear housing (10) comprises a pulley (12) on which the belt (11) is wound. The belt (11) is also wound on another pulley (not shown) which is supported by the hitching mechanism (3) and which receives the movement from the power take-off of the tractor by means of a transmission shaft (also not shown).

Under the transmission-gear housing (10) is placed a shoe (13) which allows the inward end of the cutter bar (1) to slide over the ground and which prevents cut hay from catching on the transmission-gear housing (10).

A support (14) which holds a protective device (15) is located above the cutter bar (1).

As may be seen in the later figures, the drive means housed in the housing (4) cannot prevent disks (5, 6) from desynchronizing during work. To keep the knives (7) from colliding, high disks (5) turn in different and higher planes of rotation than those in which low disks (6) turn. Knives (7) can thus sweep zones that are common in plan view without the knives (7) being able to touch one another even if they sweep the zones at approximately the same time after being desynchronized.

FIGS. 2a and 2b show a first embodiment of the invention.

FIG. 2a shows the arrangement of a high disk (5). The high disk (5) is provided with knives (7) which are mounted there by a connection allowing each knife (7) to pivot backward and line up under the high disk (5) in case an obstacle is encountered. Each high disk (5) is fastened to a driver (16) by a number of bolts (17). The driver (16) itself is fastened on an upwardly directed shaft (18) by a pin (19). The shaft (18) is guided in rotation in a bearing housing (20) by means of two roller bearings (21). The bearing housing (20) is fastened on the housing (4) by bolts (22). The shaft (18) is connected to a wheel (23) inside the housing (4). This connection is preferably detachable. In the case of FIG. 2a, the connection is made by means of a key (24) which makes the connection in rotation and by means of a snap ring (25) and a shoulder (251) on the shaft (18) which make the connection in translation.

The wheel (23) is driven by an endless transmission element such as the hexagonal belt (26).

The housing (4) consists of an approximately planar cover (27) and a bottom (28). The bottom (28) is trough-shaped and comprises a rear part (29) of folded sheet metal and sliding means (30). The sliding means (30) allow the cutter bar (1) to slide on the ground (31). For this purpose, the sliding means (30) have the shape of a ski. Since the sliding means (30) are subjected to heavy wear, it is preferable to be able to change them rapidly. For this purpose, the sliding means (30) are removably fastened to the rear part (29) and the cover (27) by two bolts (32) (see FIGS. 7 and 8), and, in the front, are fastened to the cover (27) only by a bolt (33). The cover (27) and the rear part (29) are connected at the back by bolts (34).

To avoid weighing down the housing (4), the sliding means (30) are an integral part of the housing (4). It should be particularly noted that the sliding means (30) close the front part of the housing (4) and at least partially close the lower face of the housing (4).

FIG. 2b shows the arrangement of a low disk (6). The parts identical with those of FIG. 2a are designated by the same reference number. The low disk (6) is also provided with knives (7). The low disk (6) is fastened on a driver (16) with bolts (17). Just as above, the driver (16) is fastened on an upwardly directed shaft (18) by a pin (19).

The shaft (18) is guided in rotation in a bearing housing (35) by two roller bearings (21). The bearing housing (35) is fastened on the top of the housing (4) (i.e., on the cover (27)) by bolts (22).

As can be seen in FIG. 2b, the shaft (18) of the low disk (6) penetrates deeper into the housing (4) than the shaft (18) of the high disk (5). This greater penetration of the shaft (18) is permitted by the bearing housing (35), which is smaller than the bearing housing (20) of the high disk (5). The difference in height between the two bearing housings (20) and (35) corresponds to the offset between the high disk (5) and the low disk (6).

To allow the hexagonal belt (26) to turn approximately in the same plane, the part of the wheels (23) of a high disk (5) and of a low disk (6) where the transmission of movement occurs (i.e., a groove (36) in the wheel 23) is approximately in the same plane. This result is obtained by the fact that the wheel (23) of a low disk (6) occupies a position in relation to its shaft (18) different from that occupied by the wheel (23) of a high disk (5). To do this, the wheels (23) have a hub (38) which is offset in relation to the plane of symmetry (37) of their groove (36). Thus, in the case of a high disk (5), the hub (38) of the wheel (23) is essentially located above the plane of symmetry (37) of the groove (36), while in the case of a low disk (6), the hub (38) of the wheel (23) is essentially located below the plane of symmetry of the groove (36).

In FIGS. 2a and 2b, it can also be seen that the disks (5) and (6) are both provided with a stop means (39) which limits the rotation of the knives (7). This makes it possible to protect the bearing housings (20), (35) when a knife (7) lines up under the disks (5), (6). Moreover, the stop means (39) can also serve to stiffen the disks (5, 6).

A second embodiment of the invention is shown in FIGS. 3a and 3b. Parts identical with those described above are designated by the same reference number and will not be redescribed in detail.

In this example, disks (5 and 6) are directly provided with a driver (40) which is fastened by welding. The unit is then connected to an upwardly directed shaft (41). Connection in rotation is made by a splined bore made in the driver (40). The splines in the splined bore engage splines (42) on the shaft (41). The connection in translation is made by a nut (43) and a shoulder (431) on the shaft (41). The shaft (41) is guided in rotation in a bearing housing (44) by two roller bearings (21). In this example, the bearings housing (44) of high disks (5) and low disks (6) are identical. The offset in height of the high disk (5) is obtained by inserting between the bearing housing (44) and the top of the housing (4) a brace (45) the thickness of which is equal to the offset to be obtained between a high disk (5) and a low disk (6).

The brace (45) is advantageously fastened by bolts (46) that also fasten the bearing housing (44) to the top of the housing (4). For this purpose, it is seen that the bolts (46) are longer than bolts (47) which fasten the bearing housing (44) of a low disk (6) to the top of the housing (4).

So that the bolts (46) and (47) will not have to absorb all the forces that the disks (5, 6) can receive during operation, the bearing housing (44)-brace (45) unit of a high disk (5) and the bearing housing (44) of a low disk (6) are centered in a bore (48) in the housing (4). In the case of a high disk (5) (FIG. 3a), the bearing housing (44) is centered in the brace (45) with a lower roller bearing (21). For this purpose, the brace (45) contains a bore (49) into which the lower roller bearing (21) partially penetrates. The brace (45) in turn is centered in the housing (4) thanks to a centering shoulder (50) which penetrates into the bore (48) in the housing (4). In the case of a low disk (6), the lower roller bearing (21) directly penetrates partially into the bore (48) in the housing (4).

It will be noted that, during servicing of a high disk (5), it is not possible to mount the high disk (5) poorly, since the brace (45) remains in place.

FIGS. 4a and 4b represent a third embodiment of the invention. Parts identical with those described above are designated by the same reference number and will not be redescribed in detail.

In this example, the disks (5 and 6) are directly provided with a driver (51) which is welded to the associated disk. The unit is mounted on an upwardly directed shaft (18) and fastened there by a pin (19). The shaft (18) is guided in rotation in a bearing housing (52) by two roller bearings (21). In this embodiment, the bearing housing (52) of the high disks (5) and of the low disks (6) are identical. The bearing housing (52) have two support faces (53 and 54). The support faces (53 and 54) are axially offset from one another by a distance equal to the offset that should exist between the high disks (5) and the low disks (6). Moreover, the support faces (53 and 54) are also radially offset from one another. Thus, the support face (54) is radially farther from the axis (55) of the bearing housing (52) than the support face (53).

Thus, for a high disk (5), the support face (53) of the bearing housing (52) rests on an upper part (56) of the housing (4) and is fastened there by bolts (57). In this case, the upper part (56) of the housing (4) has a small bore (58) which allows passage of the shaft (18) through the housing (4). The small bore (58) has a radius smaller than the distance radially separating the support face (53) from the axis (55) of the bearing housing (52).

For a low disk (6), the support face (54) of the bearing housing (52) rests on the upper part (56) of the housing (4) and is fastened there by bolts (59). In this case, the upper part (56) of the housing (4) has a large bore (60) which allows passage both of the shaft (18) and of the support face (53) through the housing (4). The large bore (60) has a radius larger than the distance radially separating the support face (53) from the axis (55) of the bearing housing (52) but smaller than the distance radially separating the support face (54) from the axis (55) of the bearing housing (52).

In the third embodiment of the invention, the wheel (23) is also removably connected to the shaft (18). As shown in FIG. 5, the connection in rotation is assured by a flat surface (61) made on the shaft (18) which cooperates with a broached hole (62) made in the hub (38) of the wheel (23).

The housing (4) is made slightly differently from the preceding examples. The upper part (56) of the housing (4) is folded toward the back in a prone U shape so that the back part (63) of the bottom (28) is planar. As in the preceding examples, the sliding means (30) are fastened on the back part (63) by bolts (32) to form the bottom (28). The bottom (28) is then fastened to the upper part (56) with bolts (33) and (64).

Figure 6B:
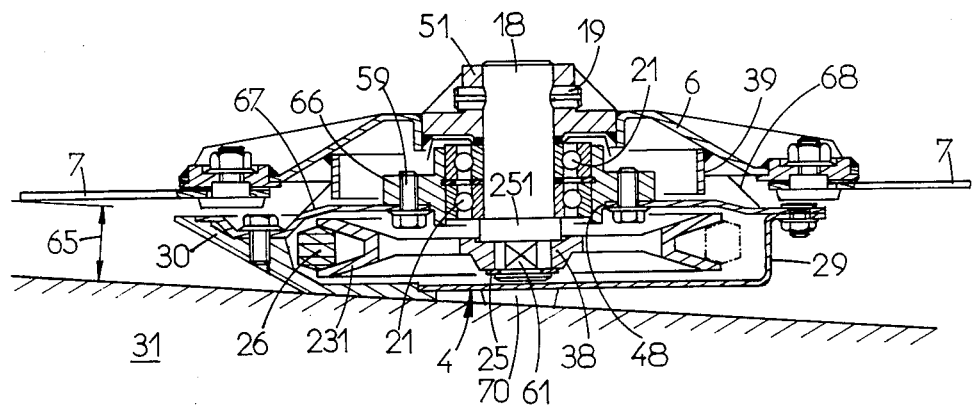
FIG. 6b is a view of the cutter bar of the fourth embodiment of the invention, cut along plane VIb in FIG. 1.

FIGS. 6a and 6b show a fourth embodiment of the invention. Parts identical with those described above are designated by the same reference numbers and will not be redescribed in detail.

In this example and as can be seen in FIG. 6a, the high disk (5) is inclined downwardly toward the front so that, at the front of their paths, the knives (7) of each high disk (5) pass approximately at the same distance (65) from the ground (31) as the knives (7) of a low disk (6), while, at critical spots, the knives (7) rotate at different levels. The work performed by the mower is thus more satisfactory.

In this example, the shafts (18) of the high disks (5) and the low disks (6) are guided in rotation in identical bearing housings (66). Bearing housings (66) are fastened on an upper part (67) of the housing (4) by bolts (59) which are the same for high disks (5) and low disks (6). The offset in height of the high disks (5) is obtained by bulges (68) made in upper part (67) by stamping, for example. The bulges (68) extend to the places where the high disks (5) are fastened to the upper part (67). Moreover, the bulges (68) serve to determine the inclination of the high disks (5).

In addition, the summit of the bulges (68) extend relatively close to the stop elements (39) of the disks (5 and 6). The stop elements (39) can thus perform an additional function that they have performed in the preceding examples only in the case of low disks (6). This additional function consists in creating a baffle which avoids winding of plant debris or any stringlike bodies around the bearing housing (66) and which brake introduction of such plant debris or any stringlike bodies between the disks (5, 6) and the bearing housing (66). Roller bearings (21) are thus effectively protected, which increases their working life.

It will be noted that the brace (45) placed under the high disk (5) of the example of FIG. 3a can also, within the scope of the invention, extend under the stop means (39) of the high disk (5) to form a baffle braking the introduction of plant debris or stringlike bodies under the high disk (5).

As can be seen in FIG. 1, the low disk (6) located at the end of the cutter bar (1) distant from the hitching mechanism (3) is surmounted by the rotary windrowing device (8). Since the rotary windrowing device (8) must laterally move the hay cut by the low disk (6), rather considerable power is required to drive it. For this reason, it is preferable that the hexagonal belt (26) be wound to the maximum on the wheel (231) which is connected to the outward low disk (6). Since the disks (5 and 6) rotate in opposite directions, it therefore happens that, at certain spots, the hexagonal belt (26) must go from the rear part of an inclined wheel (23) onto an adjacent wheel (231) (shown in FIG. 6a). The rear part of an inclined wheel (23) is higher than the adjacent wheel (231). The housing (4) therefore must have a certain thickness to allow the passage of the hexagonal belt (26). To keep this thickness as small as possible and thus to have an acceptable distance (65) (which is the cutting height), it is seen in FIGS. 6a and 6b that the wheel (23) of the high disk (5), inclined toward the front, is farther from the high disk (5) than the adjacent wheel (231) is from the adjacent low disk (6). The difference in level between the rear part of a wheel (23) and an adjacent wheel (231) therefore is small.

However, it is possible, in other cases, that the hexagonal belt (26) engages inclined wheels (23) at their front parts. Since the front part of the inclined wheels (23) is approximately at the same level as the adjacent wheels (231) (see the hexagonal belt (26) shown in broken lines in FIGS. 6a and 6b), the hexagonal belt (26) can move approximately in one plane.

This embodiment is very economical. For inclined high disks (5) and for low disks (6), the shafts (18), the wheels (23 and 231), the bearing housing (66), and the bolts (59) which fasten the bearing housing (66) to the upper parts (67) of the housing (4) are all identical.

Moreover, in both cases, the bearing housings (66) are centered in the upper part (67) of the housing (4), and in both cases the stop elements (39) form a baffle with the upper part (67) of the housing (4).

It is, of course, possible within the scope of the invention also to use this embodiment in the case where the high disks (5) are not inclined but simply axially offset in relation to the low disks (6).

FIG. 7 shows the housing (4) more fully. The housing (4) is, for example, that of the mower of FIGS. 2a and 2b. As said above, the sliding means (30) are an integral part of the housing (4). Each sliding means (30) is fastened to the cover (27) and to the rear part (29) of the bottom (28) with two bolts (32) and a bolt (33). The arrangement of the bolts (32) is shown in section and on an enlarged scale in FIG. 8. Each sliding means (30) comprises two bosses (70) each of which contains a threaded hole (71). The rear part (29) of the bottom (28) is provided with braces (72) which are welded there and extend to the cover (27). The bolt (32) is engaged from the top so as to go through the cover (27), the corresponding brace (72), and the rear part (29) of the bottom (28). The bolt (32) is screwed in the threaded hole (71) of the corresponding boss (70). The stiffness of the housing (4) is thus reinforced by connecting the sliding means (30), the rear part (29) of the bottom (28), and the cover (27) together.

FIG. 7 also shows, looking downwardly, that the front edge (73) of the sliding means (30) has an approximately circular form centered approximately on the axis of rotation of the corresponding disk (5, 6). Advantageously, the front edge (73) extends slightly beyond the end path described by the corresponding disk (5, 6) during its rotation. The sliding means (30) can thus also perform a function of protecting the front of the disks (5, 6).

An element 74 is located in the space between two neighboring sliding means (30). The element (74), as can be seen in FIG. 9, is relatively pointed to reduce the risk of hooking of plant debris between two sliding means (30). The element (74) is fastened on the rear part (29) of the bottom (28) by a bolt (75) which goes through the element (74) and is screwed into a nut (76) welded on a vertical edge on the rear part (29) of the bottom (28).

While the invention has just been described in the light of some examples, it will be understood that it will not be going outside the scope of this invention if these different examples are combined or if improvements are made thereto. In particular, the means for driving the disks (5, 6) can be different from the wheels (23, 231) and the hexagonal belt (26). They can, for example, consist of a cascade of friction wheels.

Obviously, numerous (additional) modifications and variations of the present invention are possible in light of the above teachings. It is therefore to be understood that, within the scope of the appended claims, the invention may be practiced otherwise than as specifically described herein.

I claim:
1. A rotary mower comprising:
   (a) a housing;
   (b) first cutting elements extending above said housing, each of said first cutting elements being connected to a corresponding one of upwardly directed shafts, which are guided in rotation in a corresponding bearing housing extending to an upper part of said housing, said first cutting elements being provided with cutting tools rotating in a first plane of rotation;
   (c) second cutting elements extending above said housing, each of said second cutting elements being connected to a corresponding one of upwardly directed shafts which are guided in rotation in a corresponding bearing housing extending to said upper part of said housing, said second cutting elements being provided with cutting tools rotating in a second plane of rotation different from said first plane of rotation;
   (d) said first and said second cutting elements extending above said housing in such a manner that first and second cutting elements are situated alternately along said housing; and
   (e) drive means for driving said cutting elements in rotation, said drive means being supported by said housing and comprising a plurality of wheels which are able to be desynchronized, each of said wheels can be fastened to the corresponding one of said upwardly directed shafts in two different positions, a first position adapted for said first cutting elements and a second position adapted for said second cutting elements, whereby in said first position said wheels are farther away from the associated cutting element than in said second position.

2. A mower according to claim 1 wherein said wheels have each a hub and wherein said hub is axially offset in relation to the axis of symmetry of the part of said wheel where the transmission of movement occurs, and for the first cutting elements, said hub is essentially located above said plane of symmetry, while, for the second cutting elements, said hub is essentially located below said plane of symmetry.

3. A mower according to claim 1 wherein said wheels are connected to said shafts by a detachable connection.

4. A mower according to claim 1 wherein said bearing housing of the first cutting elements are different from said bearing housings of the second cutting elements.

5. A mower according to claim 1 wherein said bearing housings of the first cutting elements and said bearing housings of the second cutting elements are identical.

6. A mower according to claim 5, wherein said bearing housings take two different positions in relation to said housing, a first position adapted for a first cutting element and a second position adapted for a second cutting element.

7. A mower according to claim 6 wherein said first position of said bearing housings of the first cutting elements are determined by a brace.

8. A mower according to claim 7 wherein said braces extend to the vicinity of stop means made on said cutting elements to form a baffle.

9. A mower according to claim 6, wherein the upper part of said housing contains circular holes of different radii, while said bearing housings each comprises two support faces offset in relation to one another and having different radial positions, so that the second of said support faces extends radially a greater distance than the radius of the larger hole, while the first of said support faces extends radially a distance between the radius of the larger hole and the radius of the smaller hole.

10. A mower according to claim 5 wherein the upper part of said housing comprises bulges which determine said first plane of rotation.

11. A mower according to claim 10 wherein said bulges have each an upper part, and wherein said upper part extends to the vicinity of stop means made on said cutting elements to form a baffle.

12. A mower according to claim 1 wherein the upper part of said housing contains holes in which said bearing housings are centered.

13. A mower according to claim 1 wherein said first plane of rotation is disposed higher than said second plane of rotation.

14. A mower according to claim 1 wherein said first plane of rotation is more inclined toward the front than said second plane of rotation.

15. A mower according to claim 1 wherein said housing has a front part and a lower part, and wherein said housing further comprises sliding means by which said rotary mower slides on the ground, said sliding means being further adapted to at least partially close said front part and/or said lower part of said housing.

16. A rotary mower comprising:
   (a) a housing;
   (b) first cutting elements extending above said housing, each of said first cutting elements being connected to a corresponding one of upwardly directed shafts which are guided in rotation in a corresponding bearing housing extending to an upper part of said housing, said first cutting elements being provided with cutting tools rotating in a first plane of rotation;

(c) second cutting elements extending above said housing, each of said second cutting elements being connected to a corresponding one of upwardly directed shafts, which are guided in rotation in a corresponding bearing housing extending to said upper part of said housing, said second cutting elements being provided with cutting tools rotating in a second plane of rotation different from said first plane of rotation;

(d) said first and said second cutting elements extending above said housing in such a manner that first and second cutting elements are situated alternately along said housing, and said first plane of rotation is more inclined toward the front than said second plane of rotation; and (e) drive means for driving said cutting elements in rotation, said drive means being supported by said housing and comprising a plurality of wheels which are able to be desynchronized, each of said wheels being fastened to the corresponding one of said upwardly directed shafts in such a manner that a wheel fastened to a shaft on which is connected a first cutting element, is farther away from said cutting element than a wheel fastened to a shaft on which is connected a second cutting element.

17. A mower according to claim 16 wherein said housing has a front part and a lower part, and wherein said housing further comprises sliding means by which said rotary mower slides on the ground, said sliding means being further adapted to at least partially close said front part and/or said lower part of said housing.

18. A rotary mower comprising:

(a) a housing comprising an upper part, a front part, and a lower part, said upper part, said front part, and said lower part defining a hollow space;

(b) a plurality of cutting elements extending above said housing, each one of said plurality of cutting elements being connected to a corresponding one of a pluality of upwardly directed shafts which are guided in rotation in a corresponding bearing housing fastened to said housing;

(c) drive means extending in said hollow space and fastened to a corresponding one of said plurality of upwardly directed shafts for driving the corresponding one of said plurality of cutting elements in rotation; and (d) sliding means by which said rotary mower slides on the ground during use, said sliding means constituting at least partially said front part and/or said lower part of said housing.

19. A mower according to claim 18 wherein said sliding means are detachable.

20. A mower according to claim 18 wherein said sliding means protects said plurality of cutting elements in front.

21. A mower according to claim 18 wherein:
(a) said lower part of said housing further comprises a rear part and
(b) said sliding means are fastened to said rear part of said lower part of said housing and to said upper part of said housing by bolts that go through braces extending between said rear part and said upper part of said housing.

22. A mower according to claim 18 wherein:
(a) said mower comprises at least two of said sliding means and
(b) the space between two of said sliding means is closed by a close means.

* * * * *